United States Patent
Bae et al.

(10) Patent No.: US 10,838,959 B2
(45) Date of Patent: Nov. 17, 2020

(54) HARMONIZED STRUCTURED QUERY LANGUAGE AND NON-STRUCTURED QUERY LANGUAGE QUERY PROCESSING

(71) Applicant: SAP SE, Walldorf (DE)

(72) Inventors: Jin Uk Bae, Seoul (KR); Stefan Baeuerle, Rauebberg-Rotenberg (DE); Christian Bensberg, Heidelberg (DE); Steffen Geissinger, Wiesloch (DE); Ki Hong Kim, Seoul (KR); Taehyung Lee, Seoul (KR); Jaeyun Noh, Seoul (KR); Di Wu, Seoul (KR); Long Zhang, Xi'an (CN)

(73) Assignee: SAP SE, Walldorf (DE)

(*) Notice: Subject to any disclaimer, the term of this patent is extended or adjusted under 35 U.S.C. 154(b) by 870 days.

(21) Appl. No.: 15/483,690

(22) Filed: Apr. 10, 2017

(65) Prior Publication Data
US 2018/0293276 A1 Oct. 11, 2018

(51) Int. Cl.
G06F 16/2453 (2019.01)
G06F 16/25 (2019.01)

(52) U.S. Cl.
CPC ...... *G06F 16/24542* (2019.01); *G06F 16/258* (2019.01)

(58) Field of Classification Search
CPC ............. G06F 16/24542; G06F 16/258; G06F 16/2453
See application file for complete search history.

(56) References Cited

U.S. PATENT DOCUMENTS

| | | | |
|---|---|---|---|
| 8,356,027 B2* | 1/2013 | Jaecksch | G06F 16/24542 707/713 |
| 8,688,683 B2* | 4/2014 | Simon | G06F 16/24542 707/713 |
| 9,183,254 B1* | 11/2015 | Cole | G06F 16/2453 |
| 9,183,272 B1* | 11/2015 | Jonsson | G06F 16/245 |
| 9,418,108 B2* | 8/2016 | Jaecksch | G06F 16/24542 |
| 9,886,483 B1* | 2/2018 | Harrison | G06F 16/28 |
| 10,210,209 B2* | 2/2019 | Jaecksch | G06F 16/24542 |
| 10,269,223 B2* | 4/2019 | Kerdemelidis | G08B 6/00 |
| 10,289,723 B1* | 5/2019 | Cai | G06F 16/278 |

(Continued)

Primary Examiner — Robert W Beausoliel, Jr.
Assistant Examiner — Susan F Rayyan
(74) Attorney, Agent, or Firm — Mintz Levin Cohn Ferris Glovsky and Popeo, P.C.

(57) ABSTRACT

A method can include: generating a query execution plan for a query including a plurality of operations that operate on data from a relational database and data from a non-structured query language (NoSQL) database, the generating comprising optimizing the query by: identifying a first operation that operate on data from the relational database and an intermediate result output by a second operation, the second operation outputting the intermediate result by operating on the data from the NoSQL database; and determining a fixed datatype for the intermediate result, an indication of the fixed datatype being included in the query execution plan; and executing, based on the query execution plan, the query, the executing of the query comprising converting the intermediate result to the fixed datatype, the converting enabling the first operation to operate on the intermediate result output by the second operation along with the data from the relational database.

18 Claims, 7 Drawing Sheets

(56) References Cited

U.S. PATENT DOCUMENTS

| | | | |
|---|---|---|---|
| 10,339,137 B2* | 7/2019 | Rastogi | G06F 16/24524 |
| 10,540,330 B1* | 1/2020 | Tiwari | G06F 16/2453 |
| 2004/0083223 A1* | 4/2004 | Jones | G06F 16/25 |
| 2009/0259644 A1* | 10/2009 | Scheuermann | G06F 16/24542 |
| 2012/0089595 A1* | 4/2012 | Jaecksch | G06F 16/24542 |
| | | | 707/714 |
| 2014/0310302 A1* | 10/2014 | Wu | G06F 16/2453 |
| | | | 707/769 |
| 2015/0149436 A1* | 5/2015 | McKenna | G06F 16/2453 |
| | | | 707/714 |
| 2015/0269223 A1* | 9/2015 | Miranker | G06F 16/90332 |
| | | | 707/713 |
| 2015/0379083 A1* | 12/2015 | Lang | G06F 16/24526 |
| | | | 707/722 |
| 2016/0177953 A1* | 6/2016 | Sun | F04C 29/128 |
| | | | 418/55.1 |
| 2016/0253402 A1* | 9/2016 | Klots | G06F 16/278 |
| | | | 707/634 |
| 2016/0342654 A1* | 11/2016 | Bendel | G06F 16/24542 |
| 2017/0097957 A1* | 4/2017 | Bourbonnais | G06F 16/24532 |
| 2017/0116271 A1* | 4/2017 | Ziauddin | G06F 16/24566 |
| 2017/0344646 A1* | 11/2017 | Antonopoulos | H04L 9/008 |
| 2018/0181542 A1* | 6/2018 | Nica | G06F 17/18 |
| 2018/0218040 A1* | 8/2018 | Penmetsa | G06F 16/24547 |
| 2018/0285417 A1* | 10/2018 | Lazovic | G06F 16/24542 |
| 2019/0114294 A1* | 4/2019 | Shearer | G06F 16/252 |

* cited by examiner

FIG. 1

```
with V as                                          ─ 200
  (select
     "a" as A,
     "b"."c" as BC,                                    NoSQL
     count(*) as CNT                                   Operations
   from MYCOLLECTION
   group by "a", "b"."c")      ─ 210
  select V.A, MYTAB.col2
  from V join MYTAB on V.A = MYTAB.col1              SQL
  where V.CNT > 1;                                   Operations
```

FIG. 2A

```
with V as                                          ─ 220
  (select
     "a" as A,                    -- string
     "b"."c" as BC,               -- string          NoSQL
     to_int("b"."c") as BC_INT,   -- integer         Operations
     count(*) as CNT              -- bigint
   from MYCOLLECTION
   group by "a", "b"."c")      ─ 210
  select V.A, V.BC, V.BC_INT, MYTAB.col2
  from V join MYTAB on V.A = MYTAB.col1              SQL
  where V.CNT > 1;                                   Operations
```

FIG. 2B

240 select "employee"."address"."postcode" from document
         └─────────── 245 ───────────┘

NoSQL_Wrapper(document.document, '$.employee.address.postcode')
                                   └─────── 245 ───────┘
                                  └────────── 255 ──────────┘

HARMONIZED STRUCTURED QUERY LANGUAGE AND NON-STRUCTURED QUERY LANGUAGE QUERY PROCESSING

FIELD

The present disclosure generally relates to database processing and, more specifically, to the processing of cross-database queries.

BACKGROUND

Data held in a relational database can be organized in accordance with a schema that defines one or more relations. A relation is a set of tuples that share one or more common attributes. For example, a tuple can have, for each of these common attributes, a corresponding value. In the relational database, different relations can be stored in separate tables having rows and columns. The tuples of a relation can occupy the rows of a table while the columns of the table can store the values of the attributes shared by the tuples. Structured query language (SQL) queries are typically used to access data stored in a relational database. By contrast, a non-SQL database may be a non-relational database that does not model data based on the tabular schema associated with relational databases. For instance, in a document-oriented database (e.g., a document store), structured data can be stored as one or more documents that encapsulate and encode data into various formats including, for example, Extensible Markup Language (XML), Yet Another Markup Language (YAML), JavaScript Object Notation (JSON), Binary JSON (BSON), and/or the like. Data in a NoSQL database, such as a document store, is typically accessed using NoSQL queries.

SUMMARY

Methods, systems, and articles of manufacture, including computer program products, are provided for clustering tables. In some implementations of the current subject matter, there is provided a computer-implemented method. The method can include: generating a query execution plan for a query, the query including a plurality of operations that operate on data from a relational database and data from a non-structured query language (NoSQL) database, the generating of the query execution plan comprising optimizing the query by at least: identifying a first operation of the plurality of operations, the first operation operating on data from the relational database and an intermediate result output by a second operation of the plurality of operations, and the second operation outputting the intermediate result by at least operating on the data from the NoSQL database; and determining a fixed datatype for the intermediate result output by the second operation, an indication of the fixed datatype being included in the query execution plan; and executing, based at least on the query execution plan, the query, the executing of the query comprising converting the intermediate result to the fixed datatype, the converting enabling the first operation to operate on the intermediate result output by the second operation along with the data from the relational database.

In some variations, one or more of the features disclosed herein including the following features can optionally be included in any feasible combination. The optimizing can further include: identifying a NoSQL path expression included in the query, the NoSQL path expression being identified based at least on the NoSQL path expression failing to match a column defined by a schema of the relational database; encapsulating the NoSQL path expression in a wrapper to at least generate a corresponding wrapped NoSQL path expression, the wrapping of the NoSQL path expression enabling the NoSQL path expression to be differentiated from a structure query language (SQL) column reference; and including the wrapped NoSQL path expression in the query execution plan. The executing of the query can further include: identifying the wrapped NoSQL path expression; and resolving the encapsulated NoSQL path expression at the NoSQL database instead of the relational database.

In some variations, the intermediate result output by the second operation can include values having a plurality of different datatypes, and the converting of the intermediate result comprises converting the values included in the intermediate result from the plurality of different datatypes of the fixed data type. The fixed datatype can be determined based at least on a type of the second operation. The fixed datatype can be determined to be a numeric datatype based at least on the second operation being a count operation and/or a sum operation. The fixed datatype can be determined based at least on a default datatype of the relational database.

In some variations, the first operation can be identified based at least on an indicator of a boundary between a portion of the plurality of operations that operate on the data from the relational database and another portion of the plurality of operations that operate on the data from the NoSQL database. The indicator can include a set of parentheses enclosing the portion of the plurality of operations that operates on the data from the NoSQL database.

In some variations, the NoSQL database can be a document store.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Data held in the NoSQL database does not conform to a schema like data held in the relational database. In particular, the schema of the relational database can specify a single datatype for each attribute in a relation. As such, values for the same attribute would have the same datatype across different tuples. By contrast, in the absence of a schema, a single attribute in a NoSQL database can be associated with multiple datatypes. That is, values for the same attribute can have different datatypes across different tuples. Moreover, although some NoSQL expressions may be syntactically identical SQL expressions, these expressions are incompatible and cannot be handled in the same manner. These discrepancies between a relational database and a NoSQL database can preclude cross-database queries that operate on data held in both a relational database and a NoSQL database.

A cross-database query can include both SQL operations on data held in a relational database and NoSQL operations on data held in a NoSQL database. A query engine can be configured to optimize the cross-database query by generating a query execution plan for performing the SQL operations and the NoSQL operations included in the cross-database query. In some implementations of the current subject matter, optimizing the cross-database query can include identifying the SQL operations and the NoSQL operations in the cross-database query. The NoSQL operations can be included in a subtree of the query execution plan for the cross-database query. Intermediate results output by these NoSQL operations can further be materialized into a temporary table, which enables these intermediate results to be ingested by one or more SQL operations in the cross-database query. As noted earlier, data from the NoSQL database can include, for the same attribute, values that have different datatypes. By contrast, values for a single attribute in a relational database can have only a single datatype. Thus, optimizing the cross-database query can further include determining a fixed datatype for the intermediate results output by the NoSQL operations.

In some implementations of the current subject matter, the query engine can be further configured to differentiate between syntactically identical but incompatible SQL expressions and NoSQL expressions. For example, a NoSQL path expression may be syntactically identical to a SQL column reference. However, a NoSQL path expression cannot be resolved in a relational database because the NoSQL path expression may reference a nonexistent column in the relational database. As such, during optimization of a cross-database query, the query engine can be configured to identify, based on the schema of the relational database, NoSQL path expressions included in the cross-database query. For instance, the path specified by a NoSQL path expression can fail to match any column defined by the schema of the relational database. The query engine can further generate a query execution plan in which NoSQL path expressions are only resolved at a NoSQL database and not at the relational database.

The query engine can be further configured to execute the cross-database query based at least on a query execution plan specifying an order for performing the SQL operations and the NoSQL operations included in the cross-database query. In some implementations of the current subject matter, executing the cross-database query can include performing the NoSQL operations in the cross-database query. Because the intermediate results of the NoSQL operations can be subsequently ingested by one or more SQL operations, the query engine can convert values from the intermediate results that are associated with the same attribute into a corresponding fixed data type before performing the SQL operations in the cross-database query that ingests these intermediate results output by the NoSQL operations.

Figure 1:
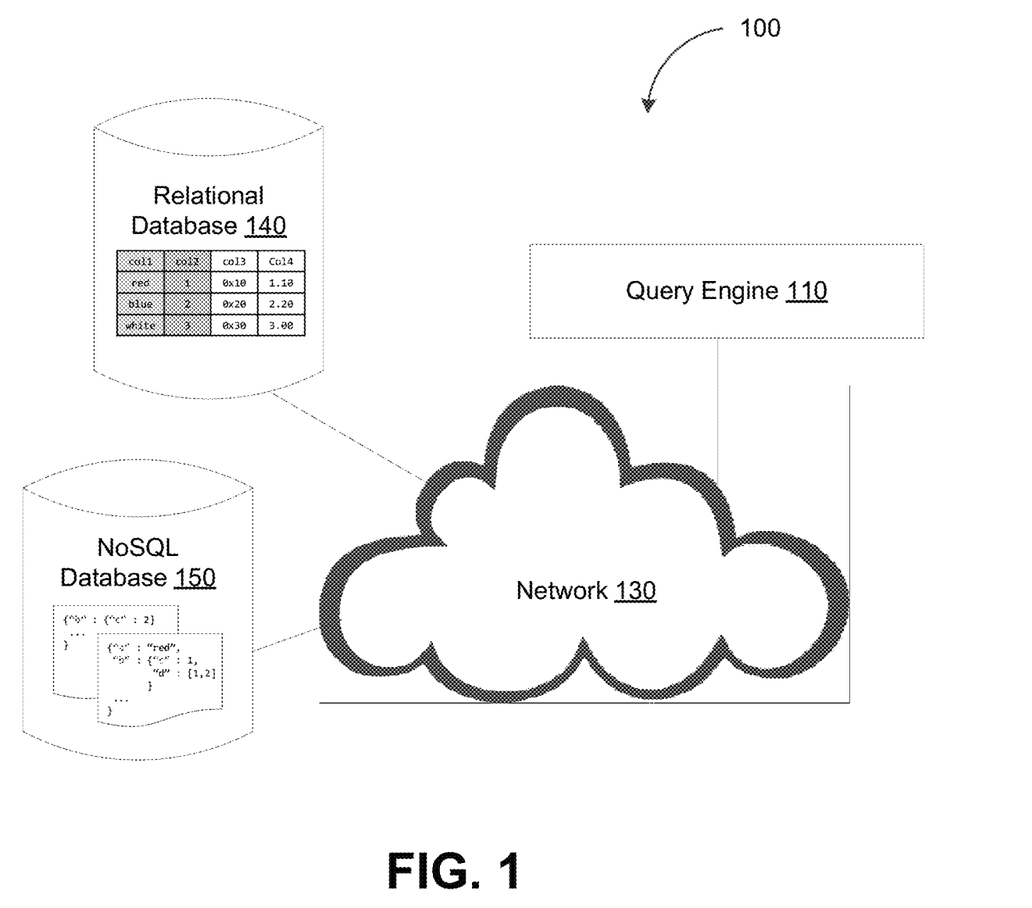
FIG. 1 depicts a system diagram illustrating a query processing system consistent with implementations of the current subject matter.

FIG. 1 depicts a system diagram illustrating a query processing system 100 consistent with implementations of the current subject matter. Referring to FIG. 1, the query processing system 100 can include a query engine 110 that is communicatively coupled, for example, via a network 130 to a plurality of databases including, for example, a relational database 140 and a NoSQL database 150. The network 130 can be any wired and/or wireless network including, for example, a wide area network (WAN), a local area network (LAN), the Internet, and/or the like. As shown in FIG. 1, the NoSQL database 150 can be a document store. However, it should be appreciated that the NoSQL database 150 can implement any NoSQL model including, for example, a key-value store, a graph database, an object database, a tuple store, a Resource Description Framework (RDF) database, a multi-value database, and/or the like. Furthermore, in some implementations of the current subject matter, the relational database 140 and the NoSQL database 150 can operate on a single host or within a same process, and can therefore communicate directly without the network 130.

The query engine 110 can be configured to optimize a cross-database query to generate a query execution plan for the cross-database query. In some implementations of the current subject matter, a cross-database query can operate on data held in both the relational database 140 and the NoSQL database 150. As such, optimizing the cross-database query can include identifying the NoSQL operations and the SQL operations in the cross-database query. The query engine 110 can identify the NoSQL operations based on indicators of the boundary between the SQL operations that are to be performed on data held at the relational database 140 and the NoSQL operations that are to be performed on data held at the NoSQL database 150. The cross-database query can be composed to include these indicators. These indicators can include, for example, a common table expression such as a set of parentheses that encloses one or more NoSQL operations. However, it should be appreciated that other indicators can be used as well. For example, a boundary between SQL operations and NoSQL operations can be generated by defining a SQL view with the following data definition language (DDL) statement:

Create View V AS (select . . . )

According to some implementations of the current subject matter, when optimizing the cross-database query, the query engine 110 can reorder operations within the boundary between one or more SQL operations and NoSQL operations. However, the query engine 110 can avoid reordering operations across the boundary between one or more SQL operations and NoSQL operations.

Figure 2A:
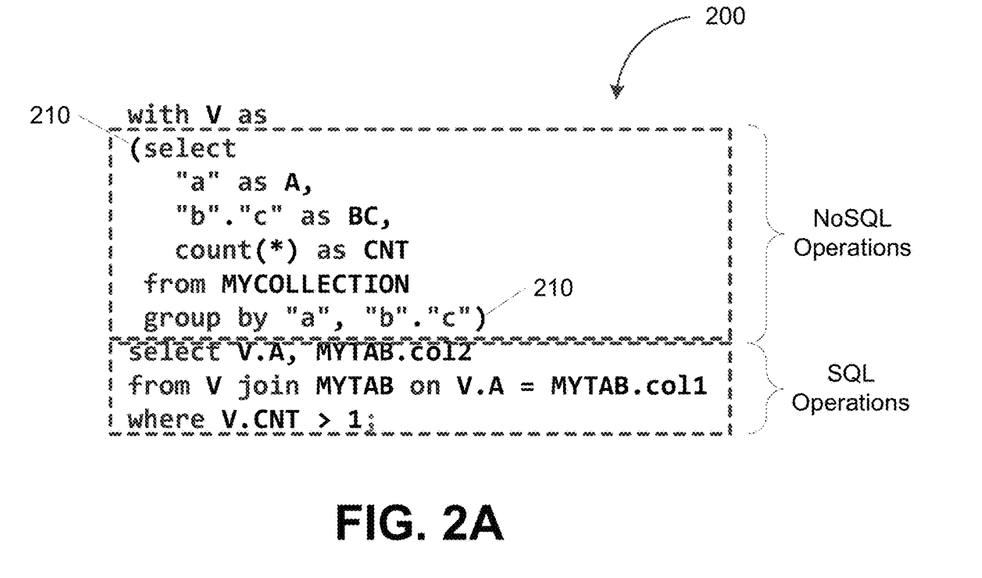
FIG. 2A depicts a cross-database query consistent with implementations of the current subject matter.

To further illustrate, FIG. 2A depicts a cross-database query 200 consistent with implementations of the current subject matter. Referring to FIG. 2A, the cross-database query 200 can include a plurality of SQL operations that are to be performed on data from the relational database 140 and a plurality of NoSQL operations that are to be performed on data from the NoSQL database 150. The boundary between the SQL operations and the NoSQL operations can be delineated by common table expression such as, for example, a pair of parentheses 210. However, it should be appreciated that the boundary between the SQL operations and the NoSQL operations can also be delineated by defining a SQL view. Based on the parentheses 210, the query engine 110 can identify the NoSQL operations and the SQL operations that are included in the cross-database query 200. For example, the SELECT operation that is enclosed within the parentheses 210 can be a NoSQL operation that is to be performed on data held at the NoSQL database 150. By contrast, the SELECT operation that is outside of the parentheses 210 can be a SQL operation that is to be performed on data from the relational database 140. Furthermore, the SELECT operation that is outside of the parentheses 210 can ingest the intermediate result output by the SELECT operation that is enclosed within the parentheses 210.

The output of operations performed on data from the NoSQL database 150 can include, for the same attribute, values having different datatypes. For example, the NoSQL database 150 can store some values of the attribute AGE as integers and other values of the attribute AGE as strings. By contrast, values associated with the same attribute in the relational database 140 can have only a single datatype. For example, all values associated with the attribute AGE can be stored in the relational database 140 as integers. Referring again to FIG. 2A, the output from the NoSQL operations enclosed within the parentheses 210 can have multiple datatypes for values associated with the same attribute. As such, in some implementations of the current subject matter, the query engine 110 can determine one or more fixed datatypes for the data output by the NoSQL operations. The query execution plan for the cross-database query 200 can include indications of the fixed datatypes for the data output by the NoSQL expressions. During execution of the cross-database query 200, values for the same attribute can all be converted based on the query execution plan to a same fixed datatype before being processed by a subsequent SQL operation.

In some implementations of the current subject matter, the fixed datatype for data output by a NoSQL operation can be determined based on the type of the NoSQL operation. For instance, values output by a NoSQL COUNT operation and/or a NoSQL SUM operation can be converted to a numeric datatype such as, for example, integer, big integer, double, decimal, and/or the like. The fixed datatype can also be specified, for example by a user, in a statement corresponding to the NoSQL operation. For example, the statement for the operation SUM(to_int(<path>)) specify that the datatype for <path> should be converted from a string to the numeric datatype integer. Alternately and/or additionally, the fixed datatype for data may be a default datatype for the relational database 140 such as, for example, strings.

Figure 2B:
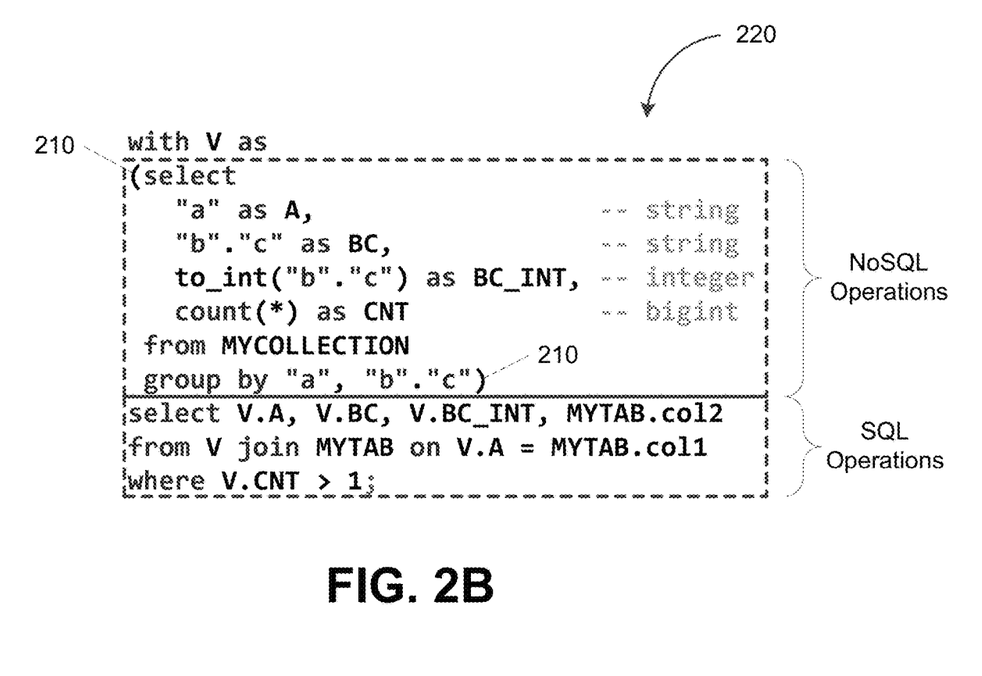
FIG. 2B depicts a determination of fixed datatypes consistent with implementations of the current subject matter.

FIG. 2B depicts a determination of fixed datatypes consistent with implementations of the current subject matter. Referring to FIGS. 2A-B, subsequent to identifying the NoSQL operations and the SQL operations in the cross-database query 200, the query engine 110 can further determine a fixed datatype for data output by the NoSQL operations enclosed within the parentheses 210. As shown in FIG. 2B, data output by some NoSQL operations can be converted to strings while data output by other NoSQL operations can be converted to integers or big integers. The query execution plan for the cross-database query 200 can include an indication of the fixed datatypes for converting the intermediate result output by the NoSQL operations such as, for example, integer, big integer, double, decimal, date, timestamp, floating point numbers, and/or the like.

Figure 2C:
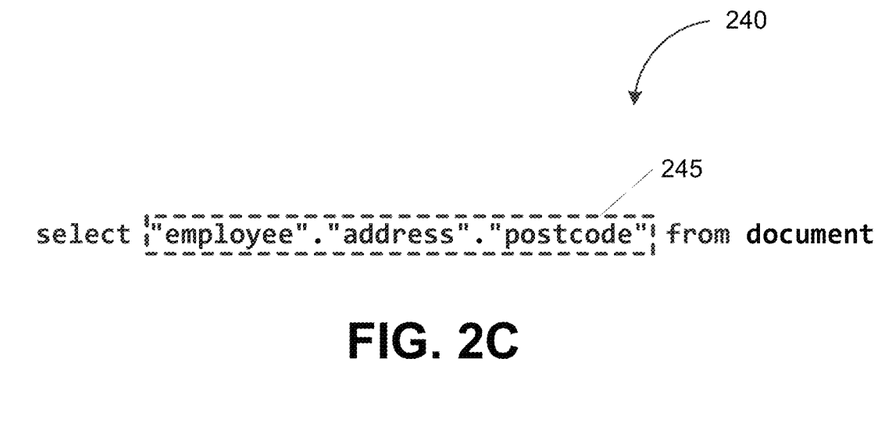
FIG. 2C depicts an operation that includes a NoSQL path expression consistent with implementations of the current subject matter.

In some implementations of the current subject matter, processing the cross-database query can further include identifying one or more NoSQL path expressions. A NoSQL path expression can be syntactically identical to a SQL column reference. However, a NoSQL path expression cannot be resolved at the relational database 140 because the NoSQL path expression may reference a non-existent column in the relational database 140. To further illustrate, FIG. 2C depicts an operation 240 that includes a NoSQL path expression 245 consistent with implementations of the current subject matter. The NoSQL path expression 245 (e.g., "employee". "address". "postcode") may be syntactically identical to a SQL column reference. However, the relational database 140 may not include an "employee" schema in which an "address" table is defined to include a column for a "postcode" attribute. As such, the NoSQL path expression 245 may not be resolved at the relational database 140. Accordingly, the query engine 110 can determine that the NoSQL path expression 245 is a NoSQL path expression and not a SQL column reference based on the absence of a matching column in the schema of the relational database 140. In the event of ambiguity in which the NoSQL path expression 245 is matched to a column in the relational database 140, the query engine 140 can determine to resolve, by default, the NoSQL path expression 245 at the relational database 140.

Figure 2D:
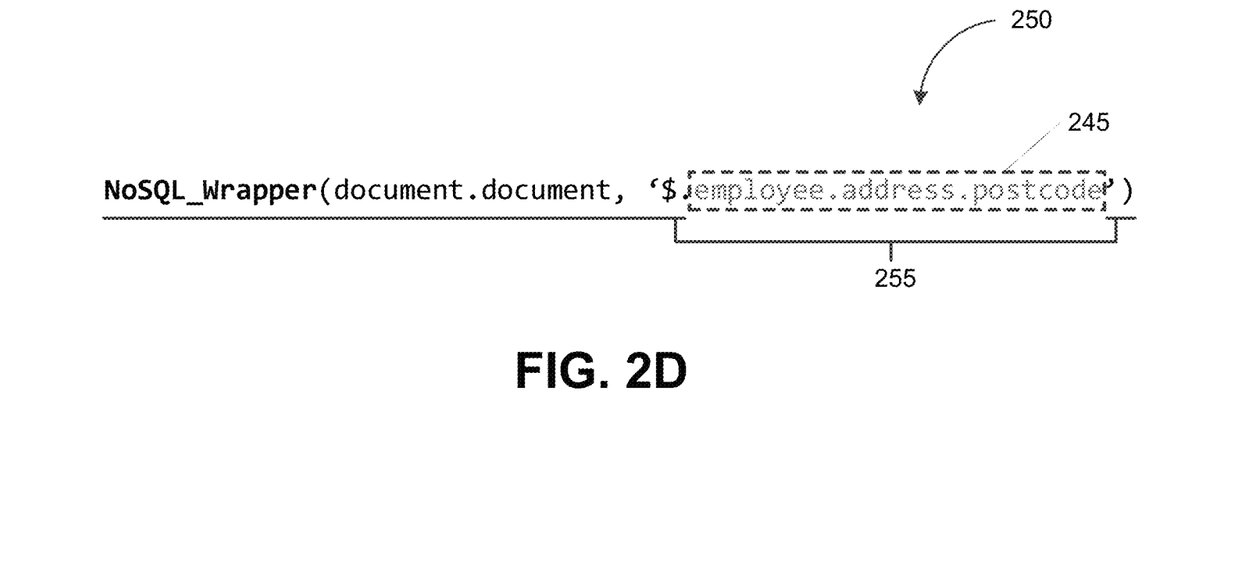
FIG. 2D depicts a wrapped NoSQL path expression consistent with implementations of the current subject matter.

In some implementations of the current subject matter, in response to identifying the NoSQL path expression 245, the query engine 110 can encapsulate the NoSQL path expression 245 in a NoSQL wrapper. FIG. 2D depicts a wrapped NoSQL path expression 250 consistent with implementations of the current subject matter. As shown in FIG. 2D, the query engine 110 can encapsulate the NoSQL path expression 245 within a NoSQL wrapper 255. The query execution plan for the corresponding cross-database query can include the wrapped NoSQL path expression 250. Wrapping the NoSQL path expression 245 can prevent the NoSQL path expression 245 from being resolved at the relational database 140 at execution time. Based on the presence of the NoSQL wrapper 255, the query engine 110 can perform the operation 240 by at least resolving the NoSQL path expression 245 at the NoSQL database 150 instead of at the relational database 140.

In some implementations of the current subject matter, the query engine 110 can execute a cross-database query based on a corresponding query execution plan. The query execution plan can identify the SQL operations and the NoSQL operations that form the cross-database query. The query execution plan can further specify an order for performing the SQL operations at the relational database 140 and the NoSQL operations at the NoSQL database 150. Moreover, the query execution plan can specify one or more fixed datatypes for data output by NoSQL operations that are subsequently ingested by one or more SQL operations. As such, executing the cross-database query can include converting data output by the NoSQL operations into the corresponding fixed datatype. For instance, the output of a NoSQL COUNT operation and/or the output of a NoSQL SUM operation can be converted into numeric datatypes such as, for example, integer, big integer, double, decimal, and/or the like. Alternately and/or additionally, the query execution plan can identify NoSQL path expressions that are to be resolved at the NoSQL database 150 and not at the relational database 140. For example, a NoSQL path expression can be encapsulated in a wrapper that enables the NoSQL path expression to be differentiated from a syntactically identical SQL column reference that is to be resolved at the relational database 140.

Figure 3:
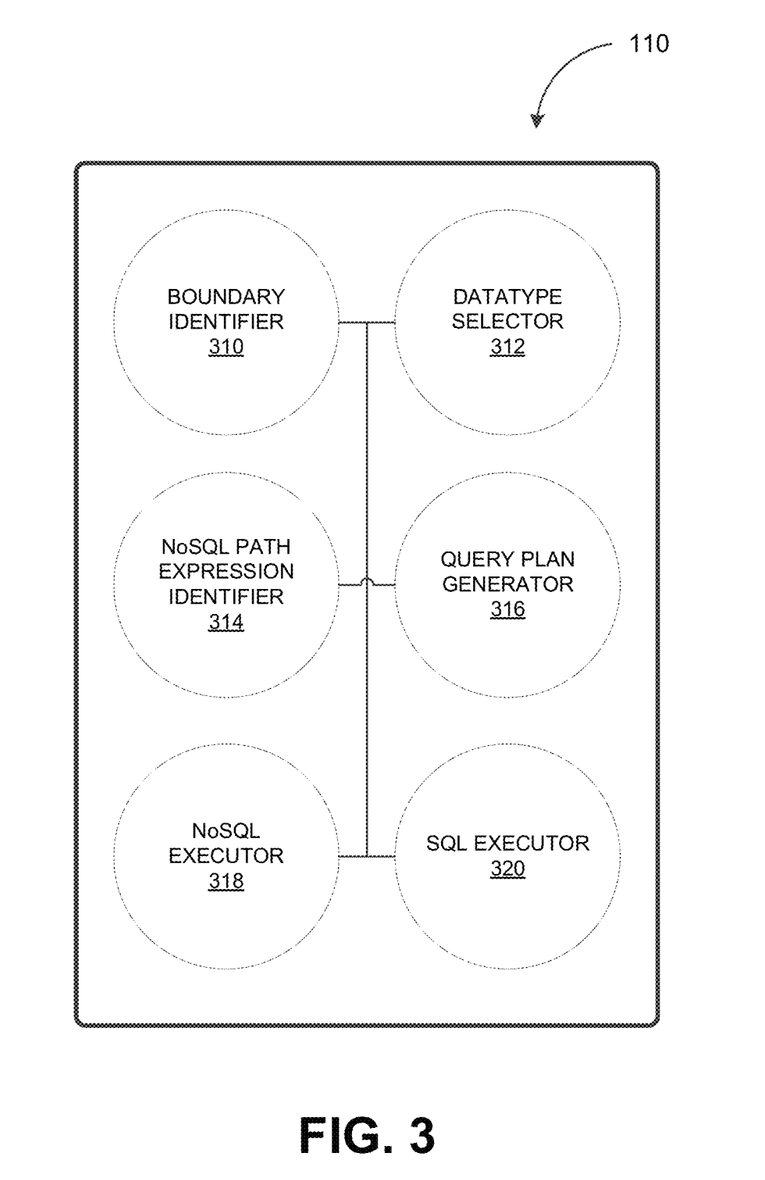
FIG. 3 depicts a block diagram illustrating a query engine consistent with implementations of the current subject matter.

FIG. 3 depicts a block diagram illustrating the query engine 110 consistent with implementations of the current subject matter. As shown in FIG. 3, the query engine 110 can include a boundary identifier 310, a datatype selector 312, a NoSQL path expression identifier 314, a query plan generator 316, a NoSQL executor 318, and a SQL executor 320. However, it should be appreciated that the query engine 110 can include additional and/or different modules than shown. For example, the query engine 110 can further include a SQL parser, a SQL semantic checker, and/or a query optimizer.

The query engine 110 can be configured to optimize one or more cross-database queries such as, for example, the cross-database query 200. A cross-database query can include one or more SQL operations that operate on data held in a relational database such as, for example, the relational database 140. Furthermore, the cross-database query can include NoSQL operations that operate on data held in a NoSQL database such as, for example, the NoSQL database 150. In some implementations of the current subject matter, the boundary identifier 310 can be configured to identify, based on one or more boundary indicators, the boundary between the NoSQL operations and the SQL operations in a cross-database query. As noted earlier, one or more of the SQL operations in a cross-database query can ingest the intermediate result output by the NoSQL operations in the cross-database query. The boundary identifier 310 can identify the NoSQL operations included in a cross-database query based on one or more indicators of the boundaries between the SQL operations and the NoSQL operations. For instance, as shown in FIG. 2A, the parentheses 210 can encapsulate one or more NoSQL operations, thereby providing an indication of the boundary between the NoSQL operations and the SQL operations forming the cross-database query 200.

In some implementations of the current subject matter, the datatype selector 312 can be configured to identify one or more fixed datatypes for the intermediate result output by the NoSQL operations identified by a boundary identifier, such as the boundary identifier 310, in one or more cross-database queries such as, for example, the cross-database query 200. A cross-database query can include one or more SQL operations that operate on data from the relational database 140 and the intermediate results output by the NoSQL operations in the cross-database query. But whereas data from the relational database 140 can include, for the same attribute, values that have the same datatype, the intermediate results output by the NoSQL operations can have different datatypes for the same attribute. For example, all values associated with the attribute AGE can be stored in the relational database 140 as integers. By contrast, the NoSQL database 150 can store some values of the attribute AGE as integers and other values of the attribute AGE as strings. As such, the datatype selector 312 can determine a fixed datatype for each NoSQL operation. The intermediate result output by one or more NoSQL operations can be converted to a corresponding fixed datatype prior to being materialized in a temporary table for ingestion by one or more SQL operations.

According to some implementations of the current subject matter, the datatype selector 312 can determine a fixed datatype based on the NoSQL operation that is outputting the data. For instance, values output by a NoSQL COUNT operation and/or a NoSQL SUM operation can be converted to a numeric datatype such as, for example, integer, big integer, double, decimal, and/or the like. The datatype selector 312 can also determine a fixed datatype based on the datatype specified for the NoSQL operation. For example, the statement associated with a NoSQL operation can specify a particular datatype for converting the output of that NoSQL operation. Alternately and/or additionally, the datatype selector 312 can be configured to determine a fixed datatype based on a default datatype such as, for example, strings.

The NoSQL path expression identifier 314 can be configured to identify NoSQL path expressions in one or more cross-database queries such as, for example, the cross-database query 200. As noted earlier, a NoSQL path expression can be syntactically identical to a SQL column reference. However, a NoSQL path expression cannot be resolved at a relational database such as the relational database 140 because the NoSQL path expression may reference a nonexistent column that is not defined by the schema of the relational database 140. Thus, in some implementations of the current subject matter, the NoSQL path expression identifier 314 can identify a NoSQL path expression, such as the NoSQL path expression 245, based on the absence of a matching column in the schema of the relational database 140. Furthermore, the NoSQL path expression identifier 314 can encapsulate the NoSQL path expression in a NoSQL wrapper such as, for example, the NoSQL wrapper 255. Wrapping the NoSQL path expression can prevent the NoSQL path expression from being resolved at the relational database 140 during execution of a corresponding cross-database query.

The query plan generator 316 can be configured to generate a query execution plan for one or more cross-database queries such as, for example, the cross-database query 200. The query plan generator 316 can generate a query execution plan that identifies the SQL operations and the NoSQL operations that form the cross-database query 200. The query execution plan can further specify an order for performing the SQL operations and the NoSQL operations in the cross-database query 200. It should be appreciated that to generate the query execution plan, the query plan generator 316 may reorder at least some of the SQL operations and/or NoSQL operations in the cross-database query 200 within a boundary between the SQL operations and the NoSQL operations. However, the query plan generator 316 can be prohibited from reordering operations across the boundary between one or more SQL operations and NoSQL operations.

In some implementations of the current subject matter, the query plan generator 316 can further generate the query execution plan to specify the fixed datatypes for one or more NoSQL operations that output intermediate results that are subsequently ingested by one or more SQL operations. For example, as shown in FIG. 2B, the output from the NoSQL COUNT operation and/or the output from the NoSQL SUM operation can be converted into a numeric datatype such, as for example, integer, big integer, double, decimal, and/or the like. Alternately and/or additionally, the query plan generator 316 can further generate the query execution plan to identify the NoSQL path expressions that are to be resolved at the NoSQL database 150 instead of the relational database 140. As noted earlier, the NoSQL path expression identifier 314 can encapsulate a NoSQL path expression, such as the NoSQL path expression 245, in a NoSQL wrapper, such as the NoSQL wrapper 255, to form the wrapped NoSQL path expression 250. The presence of the NoSQL wrapper 255 in the query execution plan can indicate that during execution of the corresponding cross-database query, the NoSQL path expression 256 encapsulated in the NoSQL wrapper 255 is to be resolved at the NoSQL database 150 and not at the relational database 140.

In some implementations of the current subject matter, the NoSQL executor 318 can be configured to execute the NoSQL operations in one or more cross-database queries such as, for example, the cross-database query 200. For example, the NoSQL executor 318 can execute the NoSQL operations based on the query execution plan that the query plan generator 316 has generated for the cross-database query 200. The NoSQL executor 318 can perform the NoSQL operations identified by the query execution plan in an order specified by the query execution plan. These NoSQL operations can be performed on data held at a NoSQL database such as, for example, the NoSQL database 150. Moreover, for a cross-database query such as the cross-database query 200 that includes both NoSQL operations and SQL operations, the NoSQL executor 318 can provide the intermediate result from performing the NoSQL operations to the SQL executor 320. For example, the NoSQL executor 318 can provide the intermediate result by at least materializing the intermediate result in a temporary table that can be accessed by the SQL executor 320.

The SQL executor 320 can be configured to execute the SQL operations in one or more cross-database queries such as, for example, the cross-database query 200. For example, the SQL executor 320 can execute the SQL operations based on the query execution plan that the query plan generator has generated for the cross-database query 200. The SQL executor 320 can perform the SQL operations identified by the query execution plan in an order specified by the query execution plan.

In some implementations of the current subject matter, executing the SQL operations in the cross-database query 200 can include performing one or more SQL operations that operate on both data from a relational database, such as the relational database 140, and the intermediate result output by NoSQL operations that are performed on data held in a NoSQL database, such as the NoSQL database 150. Here, the SQL executor 320 can access a temporary table holding the intermediate result of performing the one or more NoSQL operations in the cross-database query 200. The SQL executor 320 can perform the SQL operations that ingest these intermediate results by at least converting the values included in the intermediate results into corresponding fixed datatypes. For example, the SQL executor 320 can convert the output of the NoSQL COUNT operation and/or the output of the NoSQL SUM operation into a numeric datatype such as, for example, integer, big integer, double, decimal, and/or the like.

Figure 4A:
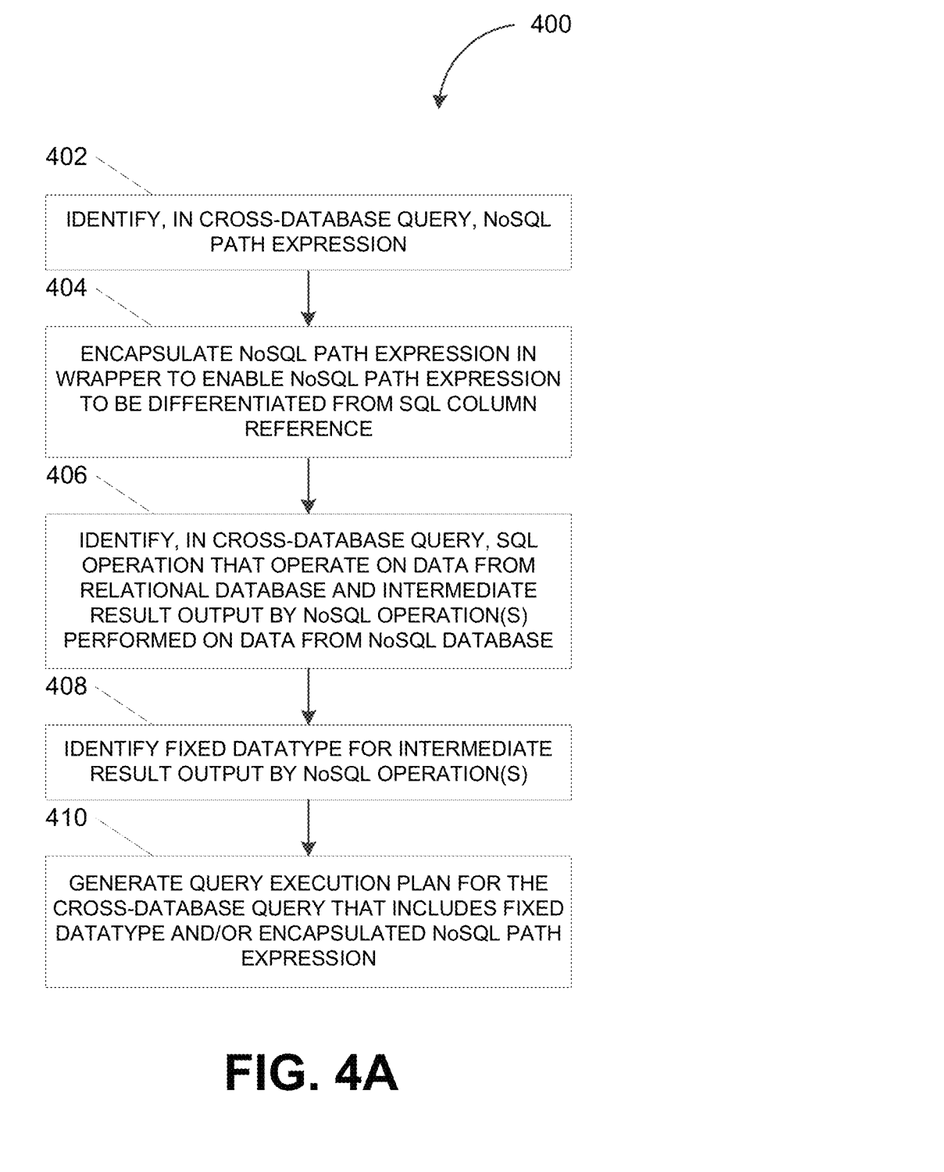
FIG. 4A depicts a flowchart illustrating a process for optimizing a cross-database query consistent with implementations of the current subject matter.

FIG. 4A depicts a flowchart illustrating a process 400 for optimizing a cross-database query consistent with implementations of the current subject matter. Referring to FIGS. 1-4A, the process 400 can be performed by the query engine 110.

The query engine 110 can identify, in the cross-database query, a NoSQL path expression (402). A NoSQL path expression, such as the NoSQL path expression 245, can be syntactically identical to a SQL column reference. However, a NoSQL path expression cannot be resolved at a relational database, such as the relational database 140, because the NoSQL path expression may reference a non-existent column in the relational database. As such, in some implementations of the current subject matter, the query engine 110, for example the NoSQL path expression identifier 314, can determine that the NoSQL path expression 245 is a NoSQL path expression and not a SQL column reference based on the absence of a matching column in the schema of the relational database. In the event of ambiguity in which a NoSQL path expression is matched to a column in the relational database, the query engine 140 can determine to resolve, by default, the NoSQL path expression at the relational database.

The query engine 110 can encapsulate the NoSQL path expression in a wrapper to enable the NoSQL path expression to be differentiated from a SQL column reference (404). In some implementations of the current subject matter, the query engine 110, for example the NoSQL path expression identifier 314, can encapsulate a NoSQL path expression in a wrapper that enables the NoSQL path expression to be differentiated from a SQL column reference that is syntactically identical to the NoSQL path expression. For instance, the query engine 110 can encapsulate the NoSQL path expression 245 in the NoSQL wrapper 255 to generate the wrapped NoSQL path expression 250. Wrapping a NoSQL path expression can prevent the NoSQL path expression from being resolved at a relational database such as the relational database 140.

The query engine 110 can identify, in a cross-database query, a SQL operation that operates on data from a relational database and intermediate result output by one or more NoSQL operations performed on data from a NoSQL database (406). In some implementations of the current subject matter, a cross-database query, such as the cross-database query 200, can include both NoSQL operations and SQL operations. Furthermore, one or more of these SQL operations can operate on data from a relational database (e.g., the relational database 140) and the intermediate results of one or more NoSQL operations performed on data from a NoSQL database (e.g., the NoSQL database 150). The query engine 110, for example the boundary identifier 310, can identify the boundary between the SQL operations and the NoSQL operations in the cross-database query. For example, as shown in FIG. 2A, a common table expression such as the parentheses 210 can specify the boundary between the SQL operations and the NoSQL operations in the cross-database query 200. The SQL operations that follow the NoSQL operations enclosed in the parentheses 210 can operate on data from the relational database 140 and the intermediate results output by the NoSQL operations enclosed in the parentheses 210. Alternately and/or additionally, the boundary between the SQL operations and the NoSQL operations can be specified by defining a SQL view.

The query engine 110 can determine a fixed datatype for the intermediate result output by the NoSQL operations (408). In some implementations of the current subject matter, the query engine 110, for example the datatype selector 312, can determine a fixed datatype for the intermediate result output by the NoSQL operations in a cross-database query such as the cross-database query 200. The query engine 110 can determine a fixed datatype for the intermediate result output by a NoSQL operation based on the type of the NoSQL operation. For instance, values output by a NoSQL COUNT operation and/or a NoSQL SUM operation can be converted to a numeric datatype such as, for example, integer, big integer, double, decimal, and/or the like. Alternately and/or additionally, the query engine 110 can determine a fixed datatype for the intermediate result output by a NoSQL operation based on a default datatype for the relational database 140 such as, for example, strings.

The query engine 110 can generate a query execution plan for the cross-database query that includes the fixed datatype and/or the encapsulated NoSQL path expression (410). The query engine, for example the query plan generator 316, can generate a query execution plan for a cross-database query such as, for example, the cross-database query 200. The query execution plan can identify the SQL operations and the NoSQL operations in the cross-database query. Furthermore, the query execution plan can specify an order for performing the SQL operations and the NoSQL operations in the cross-database query. In some implementations of the current subject matter, the query execution plan can further indicate the fixed datatypes for converting the intermediate results output by the NoSQL operations, which are subsequently ingested by one or more SQL operations. Converting the intermediate results enable these intermediate results to be processed by the SQL operations along with data from a relational database such as the relational database 140. Alternately and/or additionally, the query execution plan can include NoSQL path expressions that have been encapsulated to enable the NoSQL path expressions to be differentiated from syntactically identical SQL column references.

Figure 4B:
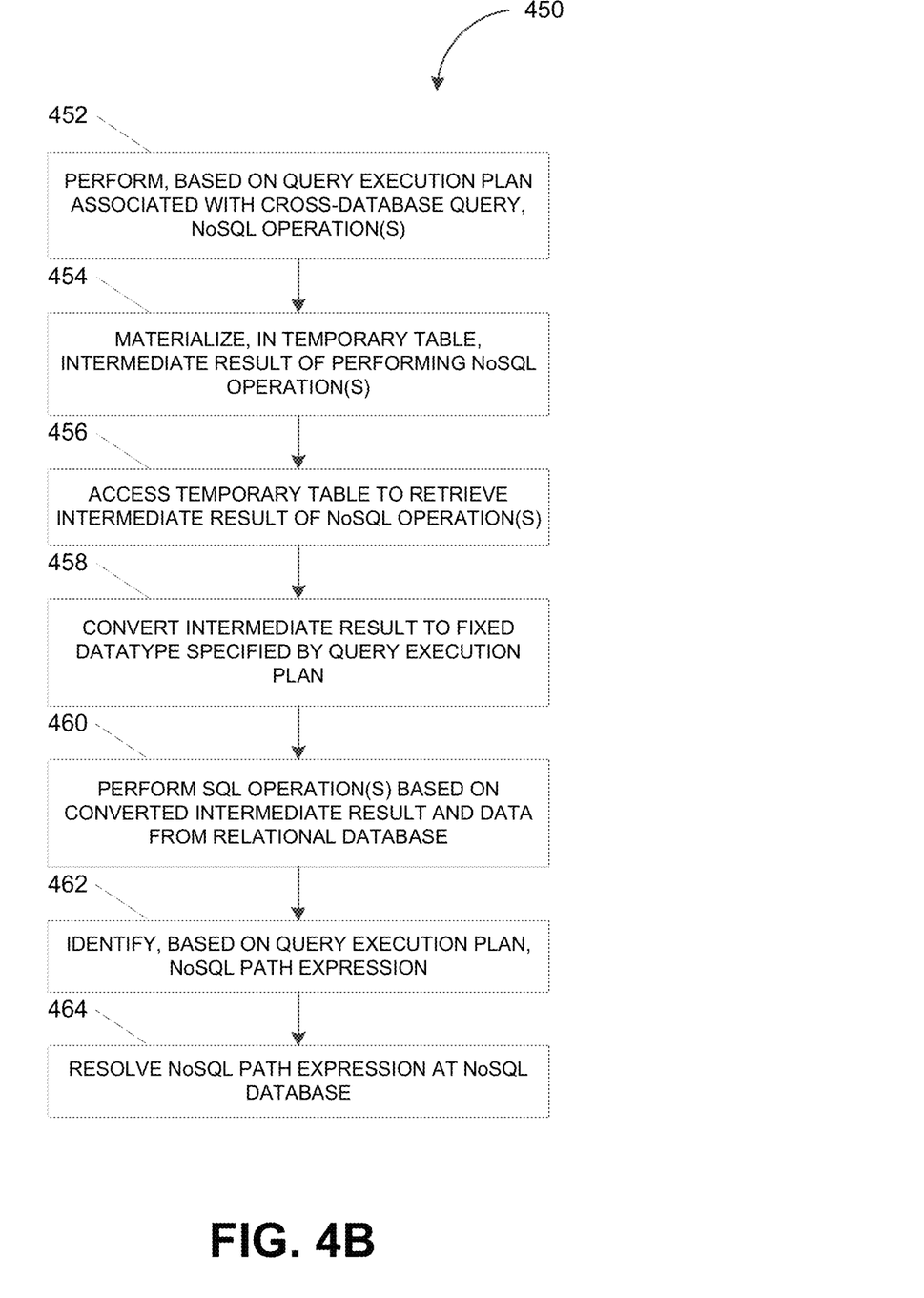
FIG. 4B depicts a flowchart illustrating a process for executing a cross-database query consistent with implementations of the current subject matter.

FIG. 4B depicts a flowchart illustrating a process 450 for executing a cross-database query consistent with implementations of the current subject matter. Referring to FIGS. 1-3 and 4B, the process 450 may be performed by the query engine 110.

The query engine 110 can perform, based on a query execution plan associated with a cross-database query, one or more NoSQL operations (452). In some implementations of the current subject matter, a query execution plan can identify which operations in a cross-database query, such as the cross-database query 200, are SQL operations and which operations in the cross-database query are NoSQL operations. The query engine 110, for example the NoSQL executor 318, can be configured to perform the NoSQL operations identified by the query execution plan. These NoSQL operations can be performed in an order specified by the query execution plan. According to some implementations of the current subject matter, intermediate result output by these NoSQL operations can be ingested by one or more subsequent SQL operations.

The query engine 110 can materialize, in a temporary table, the intermediate result of performing the one or more NoSQL operations (454). The query engine 110 can access the temporary table to retrieve the intermediate result output by the one or more NoSQL operations (456). For example, the query engine 110, for example the NoSQL executor 318, can materialize the output of the NoSQL operations in the cross-database query 200 in a temporary table where the intermediate result can be accessed, for example, by the SQL executor 320.

The query engine 110 can convert the intermediate result to a fixed datatype specified by the query execution plan (458). In some implementations of the current subject matter, a cross-database query, such as the cross-database 200, can include one or more SQL operations that operate on both the intermediate results from one or more preceding NoSQL operations and data from a relational database such as, for example, the relational database 140. However, the intermediate result output by a NoSQL operation can include values associated with the same attribute but having a plurality of different datatypes. As such, the query engine 110, for example the SQL executor 320, can convert the intermediate result output by one or more NoSQL operation into a fixed datatype specified by the query execution plan. For example, the output of a NoSQL operation can include values for the attribute AGE. However, due to the lack of a schema at the NoSQL database holding this data, the values output by the NoSQL operation can be both integers and strings. Thus, the query engine 110 can convert the values associated with the AGE attribute into a single fixed datatype such as, for example, integers.

The query engine 110 can perform one or more SQL operation in the cross-database query based on the converted intermediate result and data from a relational database (460). In some implementations of the current subject matter, the cross-database query can include one or more SQL operations that operate on data held at a relational database (e.g., the relational database 140) and the intermediate results output by one or more preceding NoSQL operations. As such, the query engine 110, for example the SQL executor 320, can perform the one or more SQL operations using the converted intermediate results from the preceding NoSQL operation and data held at the relational database.

The query engine 110 can identify, based on the query execution plan, a NoSQL path expression (462). In some implementations of the current subject matter, a NoSQL path expression, such as the NoSQL path expression 245, may be encapsulated in a wrapper, such as the NoSQL wrapper 255, which enables the NoSQL path expression to be differentiated from a syntactically identical SQL column reference. During execution of a cross-database query, the query engine 110 can identify one or more NoSQL path expressions based on the presence of the corresponding wrappers.

The query engine 110 can resolve the NoSQL path expression at the NoSQL database (464). In some implementations of the current subject matter, a NoSQL path expression cannot be resolved at a relational database, such as the relational database 140, because the NoSQL path expression may reference a nonexistent column that is not defined by the schema of the relational database. Accordingly, when query engine 110 identifies a NoSQL path expression such as the NoSQL path expression 245, the query engine 110 can perform the corresponding operation (e.g., the operation 240) by resolving the NoSQL path expression at a NoSQL database, such as the NoSQL database 150, instead of at a relational database.

Figure 5:
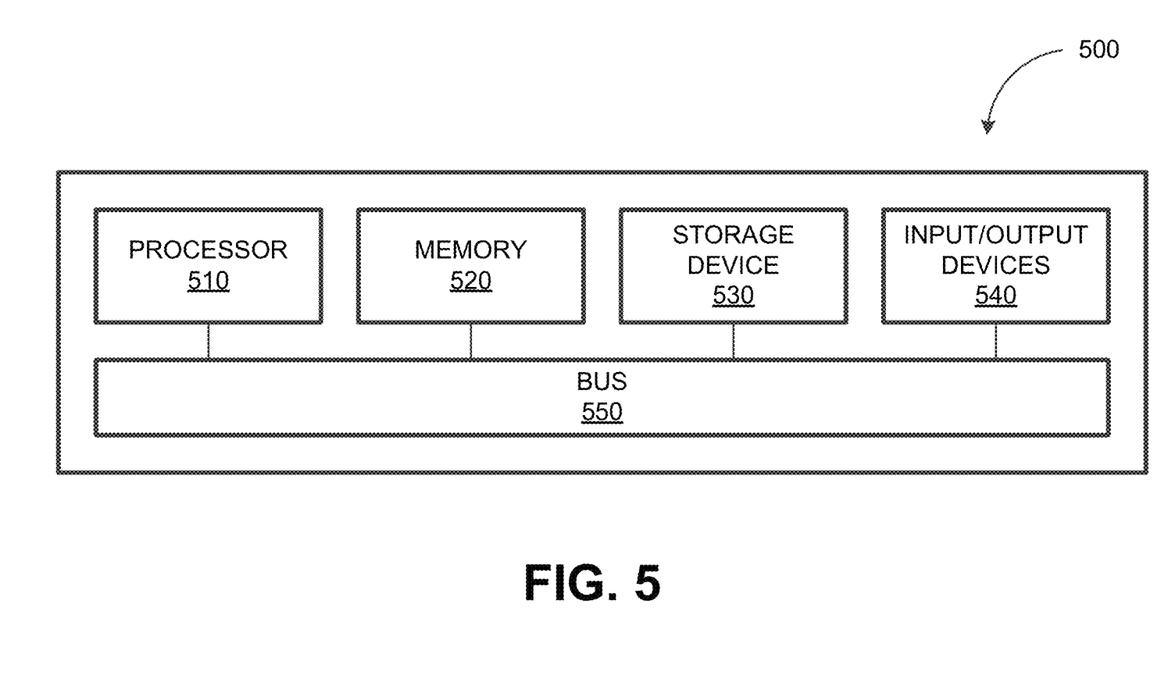
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the query engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the query engine 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
   generating a query execution plan for a query, the query including a plurality of operations that operate on data from a relational database and data from a non-structured query language (NoSQL) database, the generating of the query execution plan comprising optimizing the query by at least:
  identifying a first operation of the plurality of operations, the first operation operating on data from the relational database and an intermediate result output by a second operation of the plurality of operations, and the second operation outputting the intermediate result by at least operating on the data from the NoSQL database;
  determining a fixed datatype for the intermediate result output by the second operation;
  identifying a NoSQL path expression included in the query, the NoSQL path expression being identified based at least on the NoSQL path expression failing to reference a column defined by a schema of the relational database;
  encapsulating the NoSQL path expression in a wrapper to at least generate a corresponding wrapped NoSQL path expression, the wrapping of the NoSQL path expression enabling the NoSQL path expression to be differentiated from a structure query language (SQL) column reference; and
  including, in the query execution plan, an indication of the fixed datatype and the wrapped NoSQL path expression; and
executing, based at least on the query execution plan, the query, the executing of the query comprising converting the intermediate result to the fixed datatype, the converting enabling the first operation to operate on the intermediate result output by the second operation along with the data from the relational database.

2. The computer-implemented method of claim 1, wherein the executing of the query further comprises:
  identifying the wrapped NoSQL path expression; and
  resolving the encapsulated NoSQL path expression at the NoSQL database instead of the relational database.

3. The computer-implemented method of claim 1, wherein the intermediate result output by the second operation includes values having a plurality of different datatypes, and the converting of the intermediate result comprises converting the values included in the intermediate result from the plurality of different datatypes of the fixed data type.

4. The computer-implemented method of claim 1, wherein the fixed datatype is determined based at least on a type of the second operation.

5. The computer-implemented method of claim 4, wherein the fixed datatype is determined to be a numeric datatype based at least on the second operation being a count operation and/or a sum operation.

6. The computer-implemented method of claim 1, wherein the fixed datatype is determined based at least on a default datatype of the relational database.

7. The computer-implemented method of claim 1, wherein the first operation is identified based at least on an indicator of a boundary between a portion of the plurality of operations that operate on the data from the relational database and another portion of the plurality of operations that operate on the data from the NoSQL database.

8. The computer-implemented method of claim 7, wherein the indicator comprises a set of parentheses enclosing the portion of the plurality of operations that operates on the data from the NoSQL database.

9. The computer-implemented method of claim 1, wherein the NoSQL database comprises a document store.

10. A system, comprising:
  at least one data processor; and
  at least one memory storing instructions which, when executed by the at least one processor, result in operations comprising:
    generating a query execution plan for a query, the query including a plurality of operations that operate on data from a relational database and data from a non-structured query language (NoSQL) database, the generating of the query execution plan comprising optimizing the query by at least:
      identifying a first operation of the plurality of operations, the first operation operating on data from the relational database and an intermediate result output by a second operation of the plurality of operations, and the second operation outputting the intermediate result by at least operating on the data from the NoSQL database;
      determining a fixed datatype for the intermediate result output by the second operation;
      identifying a NoSQL path expression included in the query, the NoSQL path expression being identified based at least on the NoSQL path expression failing to reference a column defined by a schema of the relational database;
      encapsulating the NoSQL path expression in a wrapper to at least generate a corresponding wrapped NoSQL path expression, the wrapping of the NoSQL path expression enabling the NoSQL path expression to be differentiated from a structure query language (SQL) column reference; and
      including, in the query execution plan, an indication of the fixed datatype and the wrapped NoSQL path expression; and
    executing, based at least on the query execution plan, the query, the executing of the query comprising converting the intermediate result to the fixed datatype, the converting enabling the first operation to operate on the intermediate result output by the second operation along with the data from the relational database.

11. The system of claim 10, wherein the executing of the query further comprises:
  identifying the wrapped NoSQL path expression; and
  resolving the encapsulated NoSQL path expression at the NoSQL database instead of the relational database.

12. The system of claim 10, wherein the intermediate result output by the second operation includes values having a plurality of different datatypes, and the converting of the intermediate result comprises converting the values included in the intermediate result from the plurality of different datatypes of the fixed data type.

13. The system of claim 10, wherein the fixed datatype is determined based at least on a type of the second operation.

14. The system of claim 13, wherein the fixed datatype is determined to be a numeric datatype based at least on the second operation being a count operation and/or a sum operation.

15. The system of claim 10, wherein the fixed datatype is determined based at least on a default datatype of the relational database.

16. The system of claim 10, wherein the first operation is identified based at least on an indicator of a boundary between a portion of the plurality of operations that operate on the data from the relational database and another portion of the plurality of operations that operate on the data from the NoSQL database.

17. The system of claim 16, wherein the indicator comprises a set of parentheses enclosing the portion of the plurality of operations that operates on the data from the NoSQL database.

18. A non-transitory computer-readable storage medium including program code, which when executed by at least one data processor, cause operations comprising:
  generating a query execution plan for a query, the query including a plurality of operations that operate on data from a relational database and data from a non-structured query language (NoSQL) database, the generating of the query execution plan comprising optimizing the query by at least:
    identifying a first operation of the plurality of operations, the first operation operating on data from the relational database and an intermediate result output by a second operation of the plurality of operations, and the second operation outputting the intermediate result by at least operating on the data from the NoSQL database;
    determining a fixed datatype for the intermediate result output by the second operation;
    identifying a NoSQL path expression included in the query, the NoSQL path expression being identified based at least on the NoSQL path expression failing to reference a column defined by a schema of the relational database;
    encapsulating the NoSQL path expression in a wrapper to at least generate a corresponding wrapped NoSQL path expression, the wrapping of the NoSQL path expression enabling the NoSQL path expression to be differentiated from a structure query language (SQL) column reference; and
    including, in the query execution plan, an indication of the fixed datatype and the wrapped NoSQL path expression; and
  executing, based at least on the query execution plan, the query, the executing of the query comprising converting the intermediate result to the fixed datatype, the converting enabling the first operation to operate on the intermediate result output by the second operation along with the data from the relational database.

* * * * *